United States Patent Office 2,731,465
Patented Jan. 17, 1956

2,731,465

5-HALO-6-AMINO-URACILS AND DERIVATIVES THEREOF

Elmer F. Schroeder, Chicago, Ill., assignor to G. D. Searle & Co., Chicago, Ill., a corporation of Illinois No Drawing. Application October 27, 1953,
Serial No. 388,691

20 Claims. (Cl. 260—256.4)

The present invention relates to a new group of 5-halo-6-aminouracils. The compounds with which the present invention is particularly concerned can be represented by the general structural formula

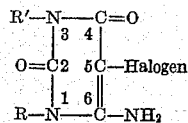

wherein R and R' are members of the class consisting of hydrogen, lower alkyl, lower alkenyl and lower hydroxyalkyl radicals.

Among the radicals which R and R' can represent are hydrogen, such lower alkyl radicals as methyl, ethyl, straight and branch chained propyl, butyl, amyl, and hexyl, the corresponding alkenyl radicals such as vinyl, allyl, crotyl, methallyl, and the corresponding hydroxyalkyl derivatives such as hydroxymethyl, hydroxyethyl, and dihydroxypropyl.

The 5-halo-6-aminouracils of my invention can be readily prepared by direct substitution of halogen for hydrogen in position 5 of a 6-aminouracil, hydrogen halide being formed simultaneously. Because of the sensitivity of the 6-amino group toward hydrolysis in acidic solution, it is necessary to carry out this reaction under conditions under which the effect of the liberated hydrogen halide is minimized. This can be most suitably achieved by working in an anhydrous medium in the presence of an acid-binding substance.

The 5-bromo derivatives can be prepared conveniently by suspending or dissolving a 6-aminouracil of the general formula

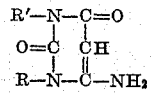

wherein R and R' are defined as hereinabove, in an anhydrous organic solvent, such as absolute ethanol, in the presence of a slight excess of an acid-binding material. With rapid stirring and moderate cooling, preferably to 10–20° C., an equivalent amount of bromine is gradually added. The reaction is rapid. The desired 5-bromo compound in some instances separates as a solid phase; in others, it remains in solution in the solvent from which it can be recovered by evaporation and addition of water. After thorough washing with water to remove the inorganic salts, the bromo compounds can usually be recrystallized from water or ethanol. They are obtained as colorless solids.

The corresponding 5-fluoro, 5-chloro and 5-iodo-6-aminouracils can be prepared by an analogous method. In the case of the 5-chloro compounds, it is more convenient to add the stoichiometric amount of chlorine as a solution in an organic solvent such as carbon tetrachloride rather than to pass the gas directly into the reaction mixture. In the case of the iodo compounds, alkali hydroxide appears to be a more suitable acid-binder than is sodium bicarbonate.

Other organic solvents, such as acetone, benzene, and other lower aromatic hydrocarbons as well as halogenated hydrocarbons such as chloroform can be used as reaction media in place of absolute ethanol. Water, too, may be used although the yields generally are lower and the products less pure than when the reaction is conducted in organic media. Various acid-binding materials can be used such as the alkali bicarbonates and carbonates and such tertiary amines as pyridine. The 5-halo-6-aminouracils can also be made without the aid of an acid-binding material if the reaction is carried out in an anhydrous medium such as glacial acetic acid. However, the yields are lower and the products less pure.

When the halogenation is carried out in water, in the absence of an acid-binding material, no 5-halo-6-aminouracil can be isolated. The principal product of the reaction is the 5,5-dihalobarbituric acid of the structural formula

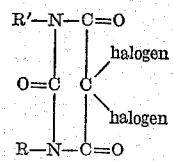

As an additional synthetic procedure, the 5-halogen atom in a 5-halo-6-aminouracil can be replaced by another member of the halogen family through a double decomposition reaction with an appropriate halide. For example, when 1,3-dimethyl-5-bromo-6-aminouracil is heated in ethanol solution with ammonium chloride, an excellent yield of 1,3-dimethyl-5-chloro-6-aminouracil is obtained. The corresponding 5-fluoro and 5-iodo derivatives result when ammonium fluoride and sodium iodide are used in place of ammonium chloride.

The compounds of my invention are potent medicinal agents which are particularly active as cardiovascular drugs. One of their outstanding physiological properties is their potent depressor effect. These compounds are also valuable as intermediates in the synthesis of other potent medicinal agents.

For example, they provide xanthines substituted in the 1, 3 and 7 positions by a great variety of substituents. Thus, treatment of 1-(β-hydroxyethyl)-3-ethyl-5-bromo-6-aminouracil with n-butylamine yields the 5-(n-butyl)-amino derivative which on heating with aqueous formic acid yields the formyl compound of the structural formula

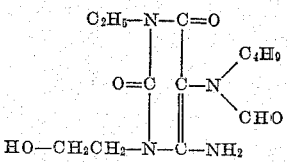

The latter on heating with alkali, yields 1-ethyl-3-(β-hydroxyethyl)-7-(n-butyl)xanthine. Treatment of 1,3-dimethyl-5-bromo-6-aminouracil with n-butylamine yields the 5-butylamino derivative; formylation followed by treatment of the formyl derivative with sodium hydroxide yields 1,3-dimethyl-7-butylxanthine.

Treatment of 1,3-dialkyl-5-bromo-6-aminouracils with an N,N-dialkylethylenediamine yields the 1,3-dialkyl-5-(β-dialkylaminoethylamino)-6-aminouracils which are active cardiovascular agents with heart stimulating action. Formylation and treatment of the resulting formyl compound with sodium hydroxide yields the 1,3-dialkyl-7-(β-dialkylaminoethyl)xanthine.

The compounds of my invention also furnish starting materials for a new synthetic approach to the 3,7-disubstituted xanthines. The older method, using alkylation of 3-substituted xanthines in position 7 gives poor yields except in the case of the methyl derivatives. For example, treatment of 1-propyl-5-bromo-6-aminouracil with butyl amine yields 1-propyl-5-butylamino-6-aminouracil, a depressor agent, which on formylation, yields the formyl derivative melting at about 245–246° C. Cyclization then yields the 1-propyl-7-butylxanthine, a diuretic agent.

The 5-halo-6-aminouracils of my invention also furnish valuable fused heterocyclic ring compounds such as pyrimidino-imidazoles, pyrimidino-triazoles, pyrimidino-pyrazines, and pyrimidino-thiazoles. Compounds of the isoxanthine type are obtained by heating with an amidine. Thus, heating of 1-propyl-3-ethyl-5-bromo-6-aminouracil with acetamidine yields the isoxanthine of the structural formula

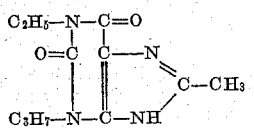

Heating with thiourea yields thiazolo-pyrimidines of the structural formula

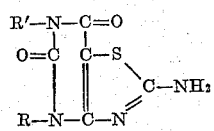

R and R' being defined as hereinabove.

The 5-halo group in the claimed compounds can also be converted to a 5-thiocyano radical by treatment with sodium thiocyanate.

The examples below illustrate in further detail compounds which constitute my invention, methods for their preparation and reactions which they undergo. However, the invention is not to be construed as limited by the details set forth in spirit or in scope. In these examples temperatures are given in degrees centigrade (° C.) and relative amounts of materials in parts by weight.

*Example 1*

At a temperature of 10–20° C., a suspension of 242 parts of 6-aminouracil and 175 parts of sodium bicarbonate in 2400 parts of absolute ethanol is treated with 304 parts of bromine which are added gradually in the course of 30 minutes. Stirring and cooling are continued for another 30 minutes. The resulting precipitate is collected on a filter, washed with water, then with ethanol, and dried. The 5-bromo-6-aminouracil thus obtained is purified by suspending in 1000 parts of water, heating to boiling, filtering while hot, and washing the insoluble portion first with water, then with ethanol. The material does not melt at temperatures up to 320° C. The compound has the structural formula

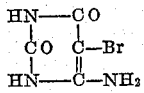

*Example 2*

676 parts of 1-n-propyl-6-aminouracil and 370 parts of sodium bicarbonate are suspended in 3200 parts of absolute ethanol. While cooling to 10–20° C. and rapidly stirring, 640 parts of bromine are gradually added during 20 minutes. Decolorization occurs rapidly until near the end of the addition, when a persistent light brown color indicates that an excess of bromine is present. Carbon dioxide is evolved during the reaction. Stirring is continued for 20 minutes more. The solid is then separated by filtration, washed first with absolute ethanol, then with water to remove soluble inorganic salts, and finally again with ethanol. The dried product is purified by dissolving in dilute aqueous sodium hydroxide solution and reprecipitation by acidification with acetic acid. The 1-n-propyl-5-bromo-6-aminouracil thus obtainned melts at about 237–239° C. It is difficultly soluble in hot water and alcohol.

The same product is obtained when the reaction is carried out using water instead of ethanol as a reaction medium and sodium hydroxide instead of sodium bicarbonate to neutralize the hydrobromic acid formed. However, the yield is somewhat lower and the product obtained is slightly discolored.

*Example 3*

155 parts of 1,3-dimethyl-6-aminouracil and 92.5 parts of sodium bicarbonate are suspended in 800 parts of absolute ethanol. The suspension is rapidly stirred, maintained at 10–20° C. by external cooling, and treated with 160 parts of bromine, which are added gradually during 10 minutes. Rapid decolorization of the bromine and evolution of carbon dioxide occur. At the end of the addition, a persistent light brown color indicates that sufficient bromine has been added. Stirring is continued for 15 minutes more. The solid reaction product is removed by filtration, washed first with absolute ethanol, then with water to remove soluble salts, and finally again with ethanol. The 1,3-dimethyl-5-bromo-6-aminouracil thus obtained is purified by recrystallization from hot water. It melts at about 214–216° C. after darkening at about 205° C.

*Example 4*

To a mixture of 31 parts of 1,3-dimethyl-6-aminouracil in 210 parts of glacial acetic acid, rapidly stirred and cooled to 10–20° C., are gradually added 32 parts of bromine over a period of 20 minutes. A thick crystalline mass forms during the addition. After 10 minutes of additional stirring, the reaction mixture is poured into 400 parts of cold water. The crystals at first dissolve completely but a white solid precipitates later. After cooling for several hours, the solid is collected on a filter, washed with water, and dried. Recrystallized from absolute ethanol, the 1,3-dimethyl-5-bromo-6-aminouracil melts at about 215–217° C. after darkening at 205° C.

*Example 5*

A mixture of 124 parts of 1,3-dimethyl-6-amino-uracil and 74.4 parts of sodium bicarbonate in 1250 parts of absolute ethanol is stirred and maintained at 10–20° C. while a solution of 56.8 parts of chlorine in 1300 parts of carbon tetrachloride is gradually added in the course of 20 minutes. Stirring is continued for 20 minutes longer after which the solvents are removed by evaporation on a steam bath. On addition of 2000 parts of water to the syrupy residue, crystals slowly form. After cooling for several hours, the crystals are collected on a filter, washed with water and dried. Recrystallized from hot water, the 1,3-dimethyl-5-chloro-6-aminouracil melts at about 239–240° C.

*Example 6*

A mixture of 234 parts of 1,3-dimethyl-5-bromo-6-aminouracil, 59 parts of ammonium chloride and 3200 parts of absolute ethanol is refluxed for 5 hours, after which the alcohol is removed by evaporation, a semi-solid residue remaining. The latter is stirred up with 2000 parts of water and the solid phase is filtered off, washed with water, and dried. After recrystallization first from water, then from 95% ethanol, the product melts at about 239–240° C.

94.8 parts of 1,3-dimethyl-5-chloro-6-amino-uracil are dissolved in 1000 parts of 3-N hydrochloric acid and boiled gently for 15 minutes. On cooling, crystals separate. These are filtered off, washed with water, and air-dried. On recrystallization from water, the monohydrate of 1,3-dimethyl-5-chlorobarbituric acid thus obtained melts at about 130–132° C.

Example 7

215 parts of the monohydrate of 1-n-propyl-3-ethyl-6-aminouracil and 93 parts of sodium bicarbonate are mixed with 1600 parts of absolute ethanol. While stirring and cooling to 10–20° C., 160 parts of bromine are added dropwise during 20 minutes. The bromine is rapidly decolorized until near the end of the addition, when a persistent yellowish color indicates that sufficient bromine has been added. After 15 minutes more stirring, most of the ethanol is removed by evaporation on a steam bath. Addition of 3000 parts of water to the syrupy residue brings about crystallization. The crystals are filtered off, washed with water, and air-dried. After recrystallization from 2250 parts of a 1:1 mixture of ethyl acetate and petroleum ether, the colorless product, 1-n-propyl-3-ethyl-5-bromo-6-aminouracil, melts at about 135–136° C. It is difficultly soluble in water, but dissolves readily in ethanol, acetone, and chloroform.

Example 8

86 parts of 1-n-propyl-3-ethyl-6-aminouracil hydrate and 37.2 parts of sodium bicarbonate are mixed with 640 parts of absolute ethanol. While stirring and cooling to 10–15° C., a solution of 28.4 parts of chlorine in 640 parts of carbon tetrachloride is added during a period of 15 minutes. The reaction is slightly exothermic and some carbon dioxide is evolved. After 15 minutes of further stirring, the solvents are almost completely removed by evaporation on the steam bath. On addition of 2000 parts of water, crystals begin to form slowly. After cooling for several hours, the crystals are filtered off, washed with water and dried. On recrystallization from 500 parts of ethyl acetate, the 1-n-propyl-3-ethyl-5-chloro-6-aminouracil melts at about 141–143° C. It is insoluble in cold water, ether, and petroleum ether; it dissolves in 30 parts of hot water, and is readily soluble in cold ethanol, acetone, and chloroform.

Example 9

A mixture of 110 parts of 1-n-propyl-3-ethyl-5-bromo-6-aminouracil, 23.6 parts of ammonium chloride and 1250 parts of absolute ethanol is refluxed for 5 hours. The alcohol is then removed by evaporation on a steam bath. Crystallization is induced by addition of 1500 parts of water to the syrupy residue. After cooling in an ice bath for 1 hour, the crystals are collected on a filter, washed with water, and dried. After recrystallization from a mixture of ethyl acetate and petroleum ether (2:1) the melting point of about 142–144° C. remains unchanged. The 1-n-propyl-3-ethyl-5-chloro-6-aminouracil thus obtained is identical with the product of the preceding example.

Example 10

215 parts of 1-n-propyl-3-ethyl-6-aminouracil (monohydrate) are dissolved in a mixture of 800 parts of absolute ethanol and 220 parts of 20% aqueous sodium hydroxide solution. While stirring and maintaining the temperature at 10–20° C., 254 parts of powdered iodine are added in portions during a period of 15 minutes. After a further 15 minutes of stirring, the iodine color almost completely disappears. About one-half of the ethanol is then removed by evaporation on a steam bath, and the remainder of the reaction mixture is poured into 3000 parts of water. On cooling, crystals form which are filtered off, washed with water and dried. Recrystallized from a 1:1 mixture of ethyl acetate and petroleum ether, the 1-n-propyl-3-ethyl-5-iodo-6-aminouracil melts at about 143–145° C. The compound darkens slowly on exposure to air, with formation of free iodine.

Example 11

195 parts of 1-allyl-3-ethyl-6-aminouracil and 93 parts of sodium bicarbonate are suspended in 1600 parts of absolute ethanol. With stirring and cooling to 10–20° C. 160 parts of bromine are added dropwise during 10 minutes. After 10 minutes of further stirring, the solid is filtered off and discarded. The filtrate is evaporated on a steam bath to a thin syrup. On addition of 2000 parts of water, crystallization occurs. The crystals are filtered off, washed with water, dried, and recrystallized from 95% ethanol. The 1-allyl-3-ethyl-5-bromo-6-aminouracil thus obtained melts at about 147–148° C.

Example 12

100 parts of 1-($\beta$-hydroxyethyl)-3-ethyl-6-aminouracil are dissolved in 505 parts of glacial acetic acid. While stirring and cooling to 10–20° C., 80 parts of bromine are gradually added during the period of 10 minutes. A deep blue color develops in the solution. After 5 minutes more stirring, 1000 parts of water are added and the solution is cooled with ice for several hours. The crystals which separate during this time are collected on a filter, washed with water and dried. After recrystallization from 3000 parts of water, 1(-$\beta$-hydroxyethyl)-3-ethyl-5-bromo-6-aminouracil melts at about 192–194° C. It is moderately soluble in ethanol, but poorly soluble in acetone, chloroform, and ether.

Example 13

A mixture of 140 parts of 1,3-diallylurea, 90 parts of cyanoacetic acid, 300 parts of glacial acetic acid and 300 parts of acetic anhydride is heated for 2 hours at 55° C. and then concentrated to a syrup under vacuum. This syrup is diluted with an equal volume of water and again submitted to vacuum distillation. 100 parts of the syrupy 1,3-diallyl-1-cyanoacetylurea are treated with a sufficient amount of a 70% aqueous sodium hydroxide solution to raise the pH above 10, cooled and permitted to stand at room temperature for 12 hours. The solid product is collected on a filter and recrystallized three times from water. After vacuum drying, the 1,3-diallyl-6-aminouracil melts at 116–118° C.

43 parts of 1,3-diallyl-6-aminouracil and 18.6 parts of sodium bicarbonate are mixed with 400 parts of absolute ethanol. In the course of 20 minutes, a solution of 14.2 parts of chlorine in 320 parts of carbon tetrachloride is gradually added with stirring while the temperature is maintained at 10–15° C. Stirring is continued for an addition 20 minutes, after which the solvents are removed by evaporation on the steam bath. The residue is treated with water and stored at 0° C. until the 1,3-diallyl-5-chloro-6-aminouracil precipitates. This precipitate is collected on a filter, washed with water and dried.

Example 14

A mixture of 248 parts of 1-n-propyl-5-bromo-6-aminouracil and 290 parts of n-butylamine is heated on a steam bath under reflux for 2 hours. The homogeneous solution is then poured in a thin stream into 3000 parts of water, crystallization occurring almost immediately. The crystals are filtered off, washed with water, and dried. On recrystallization from absolute ethanol, the 1-(n-propyl)-5-(n-butyl)amino-6-aminouracil is obtained in nearly colorless crystals melting at about 198–200° C. The product is insoluble in water, but dissolves readily in both dilute aqueous sodium hydroxide and in dilute hydrochloric acid solution.

Example 15

A mixture of 150 parts of 1-(n-propyl)-5-(n-butyl)-amino-6-aminouracil and 370 parts of formic acid in 1200 parts of water is heated at 90° C. for 20 minutes. On cooling, crystallization of 1-(n-propyl)-5-(N-formyl-N-n-butyl)amino-6-aminouracil occurs. The crystals are collected on a filter, washed with water and dried. The material dissolves in about 40 times its weight of hot water from which it separates in colorless crystals melting at about 247–248° C.

Example 16

A suspension of 215 parts of 1-(n-propyl)-5-(N-formyl-N-n-butyl)amino-6-aminouracil in 1600 parts of water is rapidly stirred and warmed to about 75° C. A solution of 64 parts of sodium hydroxide in 300 parts of water is then added. The temperature rises to about 90° C. and is maintained at that point for 30 minutes. The hot solution is stirred with decolorizing charcoal, filtered, cooled, and neutralized with hydrochloric acid. A syrupy product separates which solidifies soon. It is collected on a filter, washed with water and dried. After recrystallization from 95% ethanol, the colorless 3-(n-propyl)-7-(n-butyl)xanthine melts sharply at 148–149° C. The product is insoluble in cold water but dissolves readily in aqueous sodium hydroxide. It is soluble in cold acetone, ethyl acetate, and chloroform.

Example 17

139 parts of 1-(β-hydroxyethyl)-3-ethyl-5-bromo-6-aminouracil and 145 parts of n-butylamine are heated for 1 hour on a steam bath. The homogeneous reaction mixture is dissolved in about 800 parts of aqueous ethanol, treated with a solution of 28 parts of potassium hydroxide in 250 parts of water, and then distilled to a thick syrup under reduced pressure. The syrup is taken up in 1000 parts of hot absolute ethanol, filtered to remove potassium bromide, and again concentrated to a thick syrup consisting mainly of 1-(β-hydroxyethyl)-3-ethyl-5-n-butylamino-6-aminouracil.

To 135 parts of this syrup are added 800 parts of water and 246 parts of formic acid. The mixture is heated at 90° C. for 20 minutes to form the 1-(β-hydroxyethyl)-3-ethyl-5-(N-formyl-N-n-butyl)amino-6 - aminouracil, then alkalinized with about 360 parts of 70% aqueous sodium hydroxide solution and boiled gently for 30 minutes. On cooling, an oil separates which slowly solidifies. This solid is removed by filtration, dried, and recrystallized from a 1:1 mixture of ethyl acetate in petroleum ether. The 1-ethyl-3-(β-hydroxyethyl)-7-n-butylxanthine thus obtained melts at about 91–93° C.

Example 18

A mixture of 468 parts of 1,3-dimethyl-5-bromo-6-aminouracil and 704 parts of β-dimethylaminoethylamine is heated on a steam bath under reflux for 30 minutes. A vigorous reaction occurs and a dark-colored, homogeneous solution results. To this is added a solution of 112 parts of potassium hydroxide and about 2500 parts of water. The solvents are removed under reduced pressure and the syrupy residue is dissolved in 2000 parts of warm absolute ethanol. The insoluble precipitate of potassium bromide is removed by filtration, and the filtrate is again concentrated to a thick syrup under reduced pressure. This syrup is treated for several minutes with 3500 parts of boiling ethyl acetate and filtered, while hot, from an insoluble precipitate. On cooling, the filtrate yields 1,3-dimethyl - 5-(β-dimethylaminoethyl)amino-6-aminouracil which, on recrystallization from hot ethyl acetate, using charcoal decolorization, is obtained in slightly yellowish crystals melting at about 146–148° C. The product is soluble in cold water, ethanol, and chloroform, but insoluble in ether and petroleum ether.

To a warm solution of 120 parts of the base in 950 parts of absolute ethanol are added one equivalent of a 25% solution of anhydrous hydrogen chloride in isopropanol and 1100 parts of anhydrous ether. The crystalline precipitate is collected on a filter and recrystallized from a mixture of alcohol and ether. The monohydrochloride thus obtained melts at about 216–218° C. with decomposition. Its aqueous solution has an almost neutral reaction.

On treatment of an absolute ethanolic solution of the free base or the monohydrochloride with excess ethanolic hydrogen chloride, there is obtained a precipitate of the dihydrochloride of 1,3-dimethyl-5-(β-dimethylamino-ethyl)amino-6-aminouracil. After recrystallization from warm methanol, it melts at about 252–254° C. Its aqueous solution has a strongly acidic reaction.

Example 19

A solution of 72.3 parts of 1,3-dimethyl-5-(β-dimethylaminoethyl)amino-6-aminouracil and 135 parts of n-propyl bromide in 480 parts of butanone is refluxed for 5 hours. The resulting precipitate is collected by hot filtration and washed with warm butanone. The propiobromide thus obtained is recrystallized by dissolving in 400 parts of absolute ethanol, and addition of 500 parts of absolute ether. The colorless, water-soluble crystals thus obtained melt at about 194–196° C., after softening about 5° C. lower. The compound has the structural formula

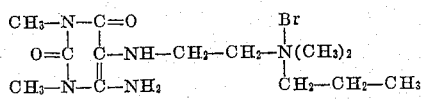

Example 20

A mixture of 165 parts of 1-n-propyl-3-ethyl-5-bromo-6-aminouracil and 97 parts of sodium thiocyanate in 1200 parts of absolute ethanol is refluxed for 4 hours. On cooling, a crystalline precipitate forms which is separated by filtration, washed with water, and dried. The material is then recrystallized from about 640 parts of 95% ethanol. The 1-n-propyl-3-ethyl-5-thiocyano-6-aminouracil thus obtained as colorless crystals melts sharply at 184–185° C.

I claim:

1. A compound of the structural formula

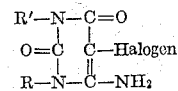

wherein R and R' are members of the class consisting of hydrogen, lower alkyl, lower alkenyl and lower hydroxyalkyl radicals and wherein the halogen atom has an atomic weight greater than 30.

2. A 5-halo-6-aminouracil wherein the halogen atom has an atomic weight greater than 30.

3. A 1-(lower alkyl)-5-halo-6-aminouracil wherein the halogen atom has an atomic weight greater than 30.

4. A 1-propyl-5-halo-6-aminouracil wherein the halogen atom has an atomic weight greater than 30.

5. A 1,3-di-(lower alkyl)-5-halo-6-aminouracil wherein the halogen atom has an atomic weight greater than 30.

6. A 1-propyl-3-ethyl-5-halo-6-aminouracil wherein the halogen atom has an atomic weight greater than 30.

7. A 1-(lower hydroxyalkyl)-3-(lower alkyl)-5-halo-6-aminouracil wherein the halogen atom has an atomic weight greater than 30.

8. A 1-(hydroxyethyl)-3-ethyl-5-halo-6-aminouracil wherein the halogen atom has an atomic weight greater than 30.

9. A 1-(lower alkenyl)-3-(lower alkyl)-5-halo-6-aminouracil wherein the halogen atom has an atomic weight greater than 30.

10. A 1-allyl-3-ethyl-5-halo-6-aminouracil and wherein the halogen atom has an atomic weight greater than 30.

11. The process of preparing a compound of the structural formula

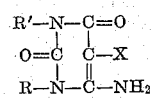

wherein R and R' are members of the class consisting of hydrogen, lower alkyl, lower alkenyl and lower hydroxyalkyl radicals and X is a halogen radical of an atomic weight greater than 30, which comprises the treatment of a compound of the structural formula

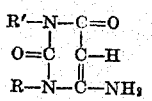

with one equivalent of $X_2$ in an anhydrous, organic solvent in the presence of one equivalent of base.

12. The process of preparing a 1,3-di-(lower alkyl)-5-halo-6-aminouracil wherein the halogen atom has an atomic weight greater than 30 which comprises the treatment of a 1,3-di-(lower alkyl)-6-aminouracil with one equivalent of halogen in an anhydrous, organic solvent in the presence of one equivalent of base.

13. The process of preparing a 1,3-di-(lower alkyl)-5-chloro-6-aminouracil which comprises the treatment of 1,3-di-(lower alkyl)-6-aminouracil with one equivalent of chlorine in an anhydrous organic solvent in the presence of one equivalent of base.

14. The process of preparing a 1,3,-di-(lower alkyl)-5-chloro-6-aminouracil which comprises the treatment of a 1,3-di-(lower alkyl)-6-aminouracil with one equivalent of chlorine in anhydrous alcoholic solution and in the presence of one equivalent of an alkali metal bicarbonate.

15. The process of preparing a 1,3-di-(lower alkyl)-5-chloro-6-aminouracil which comprises the treatment of the corresponding 1,3-di-(lower alkyl)-6-aminouracil with one equivalent of chlorine dissolved in carbon tetrachloride in the presence of one equivalent of sodium bicarbonate.

16. The process of preparing a 1,3-di-(lower alkyl)-5-bromo-6-aminouracil which comprises the treatment of the corresponding 1,3-di-(lower alkyl)-6-aminouracil with one equivalent of bromine in an anhydrous organic solvent in the presence of one equivalent of base.

17. The process of preparing a 1,3-di-(lower alkyl)-5-bromo-6-aminouracil which comprises the treatment of the corresponding 1,3-di-(lower alkyl)-6-aminouracil with one equivalent of bromine in anhydrous alcoholic solution and in the presence of one equivalent of sodium bicarbonate.

18. 1-propyl-3-ethyl-5-chloro-6-aminouracil.
19. 1-(hydroxyethyl)-3-ethyl-5-chloro-6-aminouracil.
20. 1-allyl-3-ethyl-5-chloro-6-aminouracil.

No references cited.